(12) United States Patent
Detro et al.

(10) Patent No.: US 7,400,452 B2
(45) Date of Patent: Jul. 15, 2008

(54) METHOD AND APPARATUS FOR INTERNAL FRAMES TO IMPROVE PERFORMANCE AND MANUFACTURABILITY OF OPTICAL DEVICES INCLUDING LIQUID CRYSTAL ON SILICON (LCOS) BASED KERNELS

(75) Inventors: Mike Detro, Los Gatos, CA (US); Ken Bradley, Mountain View, CA (US); Arthur Berman, San Jose, CA (US)

(73) Assignee: LightMaster Systems, Inc., Cupertino, CA (US)

( * ) Notice: Subject to any disclaimer, the term of this patent is extended or adjusted under 35 U.S.C. 154(b) by 0 days.

(21) Appl. No.: 11/252,825

(22) Filed: Oct. 18, 2005

(65) Prior Publication Data

US 2007/0091450 A1 Apr. 26, 2007

(51) Int. Cl.
*G02B 27/12* (2006.01)
*H04N 9/07* (2006.01)
(52) U.S. Cl. ..................... 359/640; 348/338
(58) Field of Classification Search ......... 359/618–619, 359/621, 625–627, 634, 637–640, 831–832; 353/20, 31–34, 37; 348/335–339
See application file for complete search history.

(56) References Cited

U.S. PATENT DOCUMENTS

| | | | |
|---|---|---|---|
| 6,183,091 B1 * | 2/2001 | Johnson et al. | 353/20 |
| 6,375,330 B1 * | 4/2002 | Mihalakis | 353/31 |
| 6,384,972 B1 * | 5/2002 | Chuang | 359/495 |
| 6,454,416 B2 * | 9/2002 | Aoto et al. | 353/31 |
| RE38,740 E * | 6/2005 | Hashizume et al. | 359/640 |
| 6,927,919 B2 * | 8/2005 | Hwang | 359/641 |
| 6,956,551 B2 * | 10/2005 | Sacre et al. | 345/88 |
| 7,002,752 B2 * | 2/2006 | Chen et al. | 359/634 |
| 7,118,230 B2 * | 10/2006 | Fujimori et al. | 353/119 |
| 2002/0001135 A1 * | 1/2002 | Berman et al. | 359/640 |
| 2004/0004769 A1 * | 1/2004 | Suzuki et al. | 359/640 |
| 2005/0141097 A1 * | 6/2005 | Ho | 359/640 |

* cited by examiner

*Primary Examiner*—Scott J. Sugarman
*Assistant Examiner*—Dawayne A Pinkney
(74) *Attorney, Agent, or Firm*—Martine Penilla & Gencarella, LLP

(57) ABSTRACT

Frames are used to hold and/or position components in precise positions in a prism assembly. The frames may be constructed using any of side caps, air gaps, recesses, and hold either a single or multiple planar components. The frames are, for example, immersed in liquid filled channels between adjacent faces of beamsplitters in the prism assembly. The planar components themselves may include waveplates, optical flats, spacer glasses, retarders, Color Selects, substrates, or any other components of the optical device. The planar components may themselves include multiple layers (e.g., polarizers, dichroics, etc). In one embodiment, a polarizer and an air gap are provided. The invention increases precision, lowers cost, and improves quality (e.g., contrast ratio) of any number of devices, but is particularly applicable to Liquid Crystal on Silicon (LCOS) and other microdisplay based projection systems such as High Definition (HD) Rear Projection Televisions (RPTVs).

18 Claims, 10 Drawing Sheets

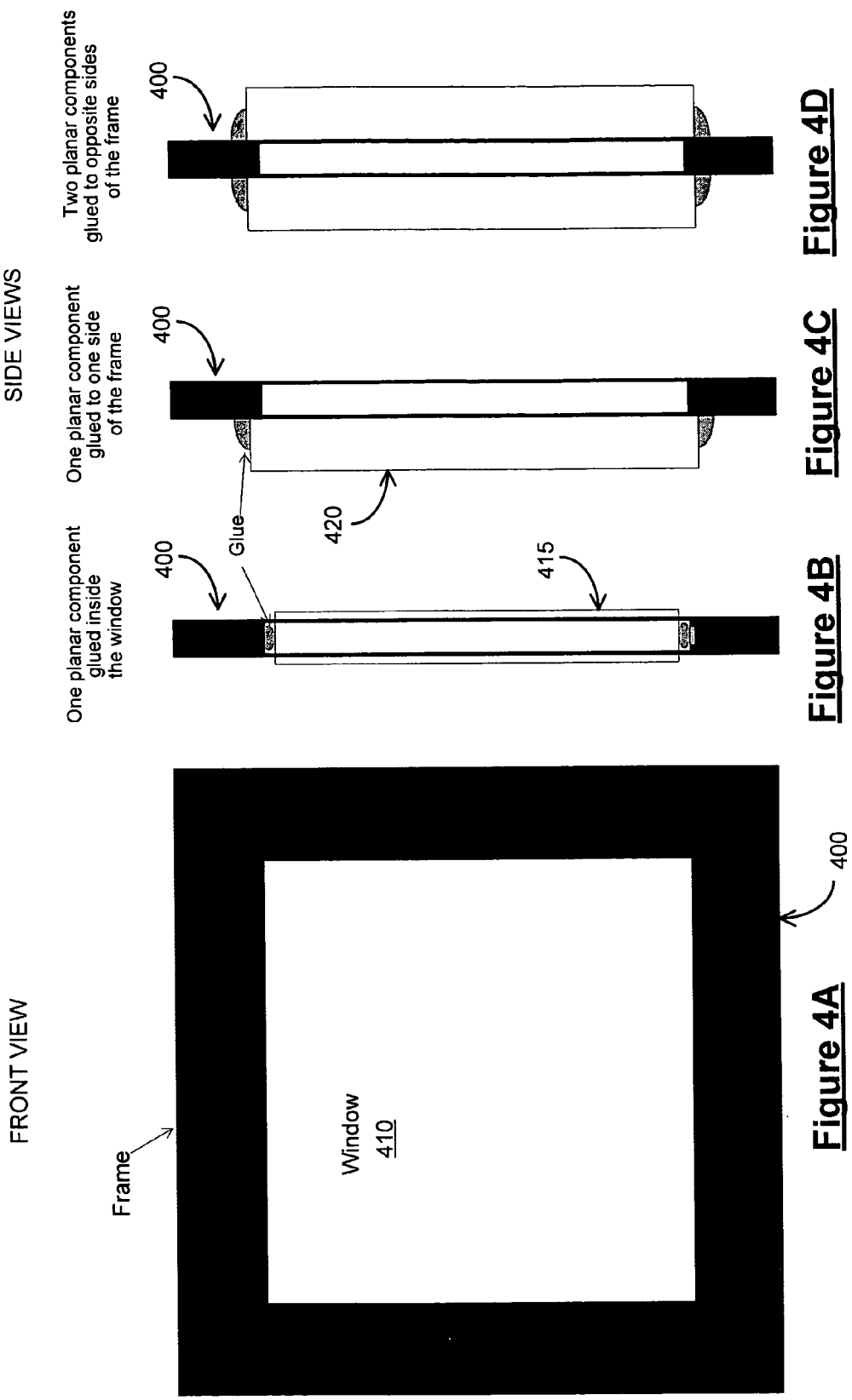

US 7,400,452 B2

METHOD AND APPARATUS FOR INTERNAL FRAMES TO IMPROVE PERFORMANCE AND MANUFACTURABILITY OF OPTICAL DEVICES INCLUDING LIQUID CRYSTAL ON SILICON (LCOS) BASED KERNELS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to the design construction of optical devices. The present invention is more particularly related to the use of internal frames in the design and construction of optical devices. The present invention is yet further related to the use of frames in the design and construction of Liquid Crystal On Silicon (LCOS) kernels.

2. Discussion of Background

The components of an LCOS based video projector 100 are explained by example of a light engine with reference to FIG. 1. As shown, white light 110 is generated by a light source 105. The light is collected, homogenized, polarized, and formed into the proper shape and otherwise processed by optics (not all shown for clarity). The light then enters a prism assembly 150 where it is broken into red, green and blue polarized light beams. A set of reflective microdisplays 152A, 152B, and 152C are provided and positioned to correspond to each of the polarized light beams (the prism assembly 150 with the attached microdisplays is called a kernel). The beams then follow different paths within the prism assembly 150 such that each beam is directed to a specific reflective microdisplay. The microdisplay that interacts with (reflects) the green beam modulates the green content of a full color video image. Similarly, the red and blue contents of the full color image are modulated by corresponding "red" and "blue" microdisplays. The prism assembly 150 then recombines the modulated beams into a modulated white light beam 160 that contains the full color video image. The resultant modulated white light beam 160 then exits the prism assembly 150 and enters a projection lens 165. Finally, the image-containing beam (white light beam 160 has been modulated and now contains the full color image) is projected onto a screen 170.

The kernel is constructed, for example, from a set of beam splitters. The example kernel in FIG. 1 uses a set of 4 polarizing beam splitters. Depending on the design of the kernel, other optical components (e.g., mainly optical elements such as polarizers, waveplates, Color Selects, filters, dichroics, optical blanks, etc.) may be disposed at various locations within the kernel. In the example kernel of FIG. 1, certain optical elements are disposed, for example, between adjacent faces of the beamsplitters.

SUMMARY OF THE INVENTION

The present inventors have realized need to efficiently place optical elements, particularly polarizers, waveplates, Color Selects, filters, dichroics, optical blanks, and other elements in an optical design efficiently and with enough precision to meet the specifications of the optical design.

In one embodiment, the present invention provides a prism assembly, comprising, a set of beamsplitters comprising a set of modulating faces and configured to, separate an input light beam into a set of component light beams, direct each component light beam to a corresponding one of a set of modulating faces of the prism assembly, and recombine light beams reflected from the modulating faces into a modulated output beam, a planar optical component, and a frame configured to position the at least one planar optical component in at least one of the component light beams.

In another embodiment the present invention is a device, comprising, a first open window, a first frame comprising a perimeter of the first open window, and a first planar optical component disposed on the first frame such that a cone of light passing through the first open window also passes through the first planar optical component. In one embodiment, the device includes a second planar component and an air gap between the planar components. The device may, for example, be immersed in an index matching or optical coupling fluid in a channel between adjacent faces of beam splitters in a prism assembly.

The present invention includes either the prism assembly or device utilized in a light projection system, kernel, and/or integrated with other optics in, for example, a High Definition (HD) Liquid Crystal On Silicon (LCOS) Rear Projection Television (RPTV).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4A is an illustration of a basic frame according to an embodiment of the present invention;

FIG. 4B is an illustration of a planar component disposed inside a frame window according to an embodiment of the present invention;

FIG. 4C is an illustration of a planar component disposed on a side of a frame window according to an embodiment of the present invention;

FIG. 4D is an example of two planar components mounted to a frame according to an embodiment of the present invention;

DESCRIPTION OF THE PREFERRED EMBODIMENTS

Figure 1:
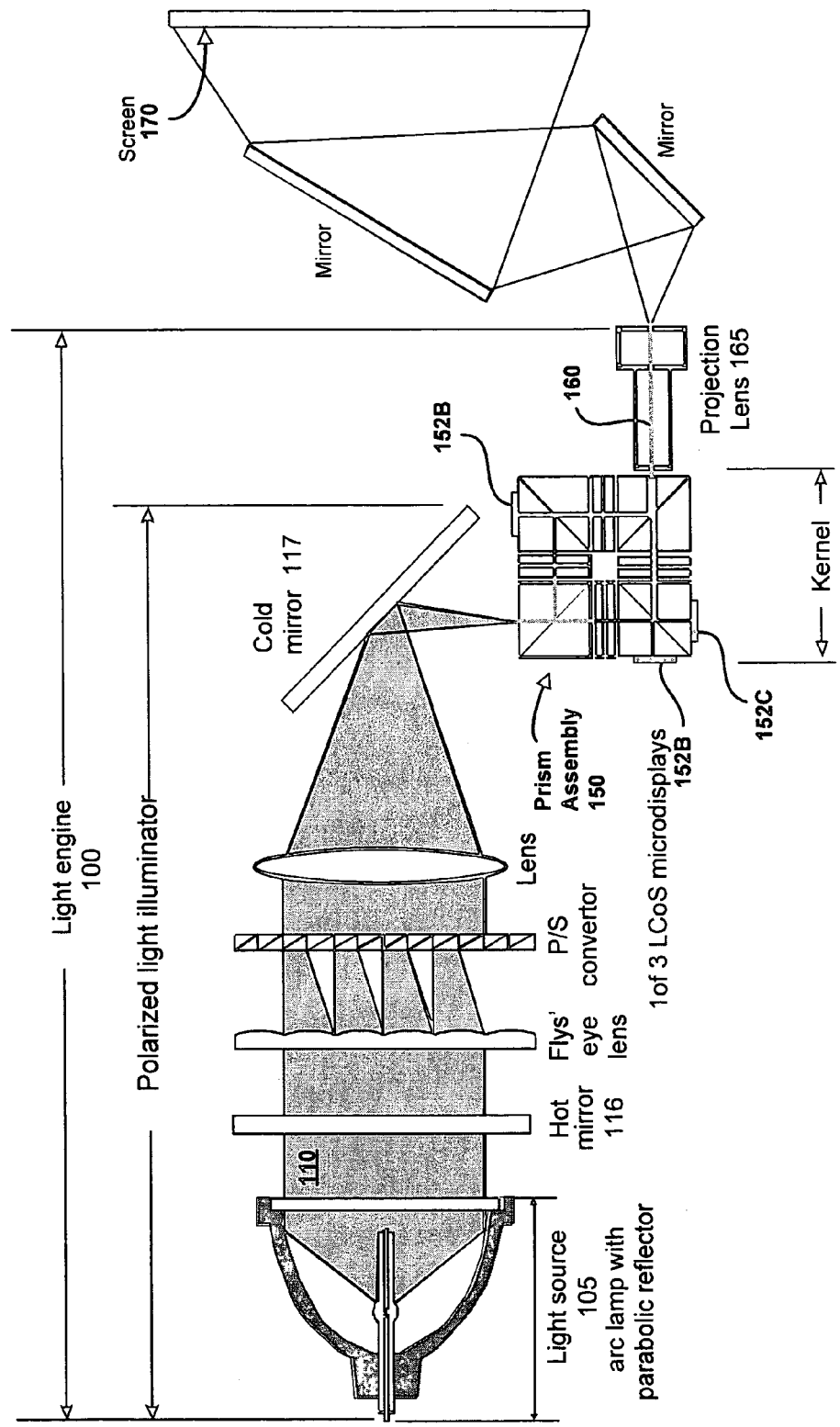
FIG. 1 is a drawing of LCOS based video projector.
Figure 2:
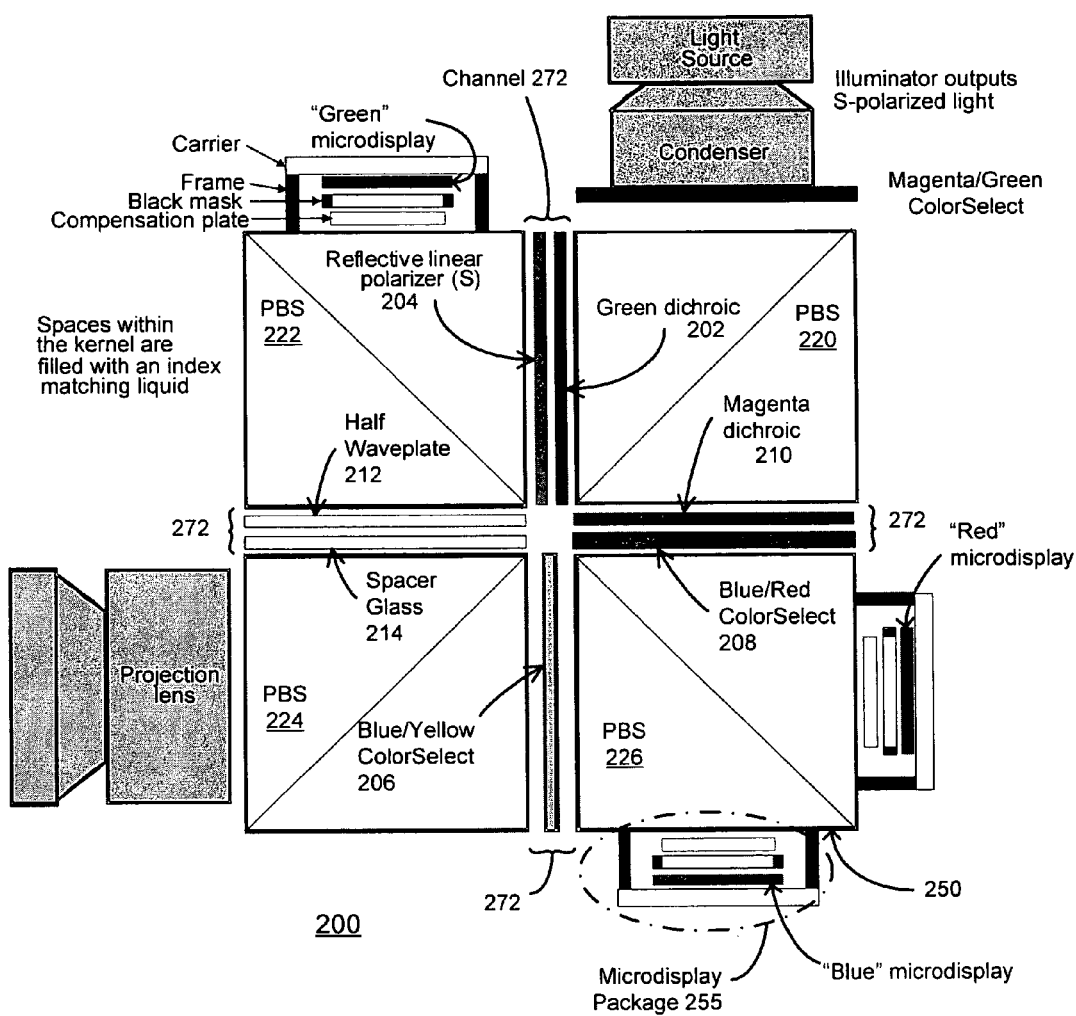
FIG. 2 is a drawing of a specific example of an lms-AT kernel 200.

Referring again to the drawings, wherein like reference numerals designate identical or corresponding parts, and more particularly to FIG. 2 thereof, there is illustrated a drawing of a specific example of an lms-AT kernel 200 (Lightmaster Systems Inc. AT model kernel). Although the present invention will be described in part using specific examples such as the LMS-AT kernel 200, the present invention is not limited to kernels or optical devices of any specific design.

FIG. 2 illustrates the positions and identifications of optical components in the lms-AT kernel.

The components include "planar" components green dichroic 202, reflective polarizer 204, blue/red ColorSelect 208, magenta dichroic 210, blue/yellow ColorSelect 206, half waveplate 212 and spacer glass 214. In the example kernel, the height and width of these "planar" components generally match that of the optical face of PBS "cubes" 220, 222, 224 and 226. It follows that the entire area of a rectangular cone of light that travels through the kernel also passes through the optical area of the planar components. As in FIG. 2, the rectangular cone of light is separated into 3 component colors and individually modulated by the "red," "green," and "blue" microdisplays, and each cone of light passes through corresponding planar components.

The size of the rectangular cone of light varies with position within the kernel. The cone is largest and almost fills the kernel input face. At the positions of the microdisplays, the cone (now separated into the 3 component cones of a color matching each microdisplay) has tapered to essentially the size of the active area of the microdisplay. However, at the positions of the planar components, the cone is smaller than the area of the planar components. "Oversized" components is a common feature of many optical systems and the lms-AT which allows the components to self position and at the same time assures that all of the corresponding cone of light passes through each of the components. The fact that the planar components are "oversized" is significant in that the planar components are expensive and their cost, at least in part, depends on size. The present inventors have realized a device that reduces cost of the kernel by reducing the sizes of the planar components, and still placing the planar components in precise enough positions that each entire cone of light still passes through the corresponding planar components.

Turning to another matter, there are many sources of scattered light within optical systems in general and the kernel specifically. Sources include diffraction from the microdisplay, scattering from defects in the PBS cubes and other components and non specular reflection from the dichroics and microdisplays. Scattered light should be effectively removed from the image containing light beam. The reason is that the presence of scattered light reduces the contrast ratio and causes non uniformities in the brightness and colors of the projected image. The lms-AT kernel does a good job of "waste light" management ("waste light" includes the scattered light) None-the-less, it is always desirable to improve the specifications of the projected image and therefore to further suppress waste light.

The S-polarization efficiency of light reflected from a PBS is low. Since PBS cubes are used in the lms-AT and other optical devices, this is a problem that should be addressed in the kernel. The conventional solution to the S-polarization reflection inefficiency is to locate a "clean up" linear polarizer optically downstream from the PBS cube's reflective output. In this way, the overall S-polarization efficiency is the product of the efficiency of the PBS cube times that of the clean up polarizer. The product can be quite high. This method has, in fact, been implemented in the lms-AT. As illustrated in FIG. 2, a reflective polarizer 204 is located in the green light channel downstream from the input PBS cube.

In the specific case of the lms-AT, however, a detail of the kernel configuration reduces the effectiveness of the reflective polarizer's clean up function. The reason is that, although the reflective polarizer has a very high efficiency when the reflective surface in "immersed" in air, its efficiency is greatly reduced when immersed in an index of refraction matching fluid (channels, e.g. channels 272, between adjacent faces of the PBSs are filled with an index matching (or optical coupling) fluid). The resulting reduced reflective polarizer efficiency, in turn, reduces the contrast ratio of the green channel. The present invention provides a device that improves the clean-up efficiency of the reflective polarizer. In the lms-AT, this improves the contrast ratio of the green channel by improving the clean up efficiency of the reflective polarizer.

Figure 3:
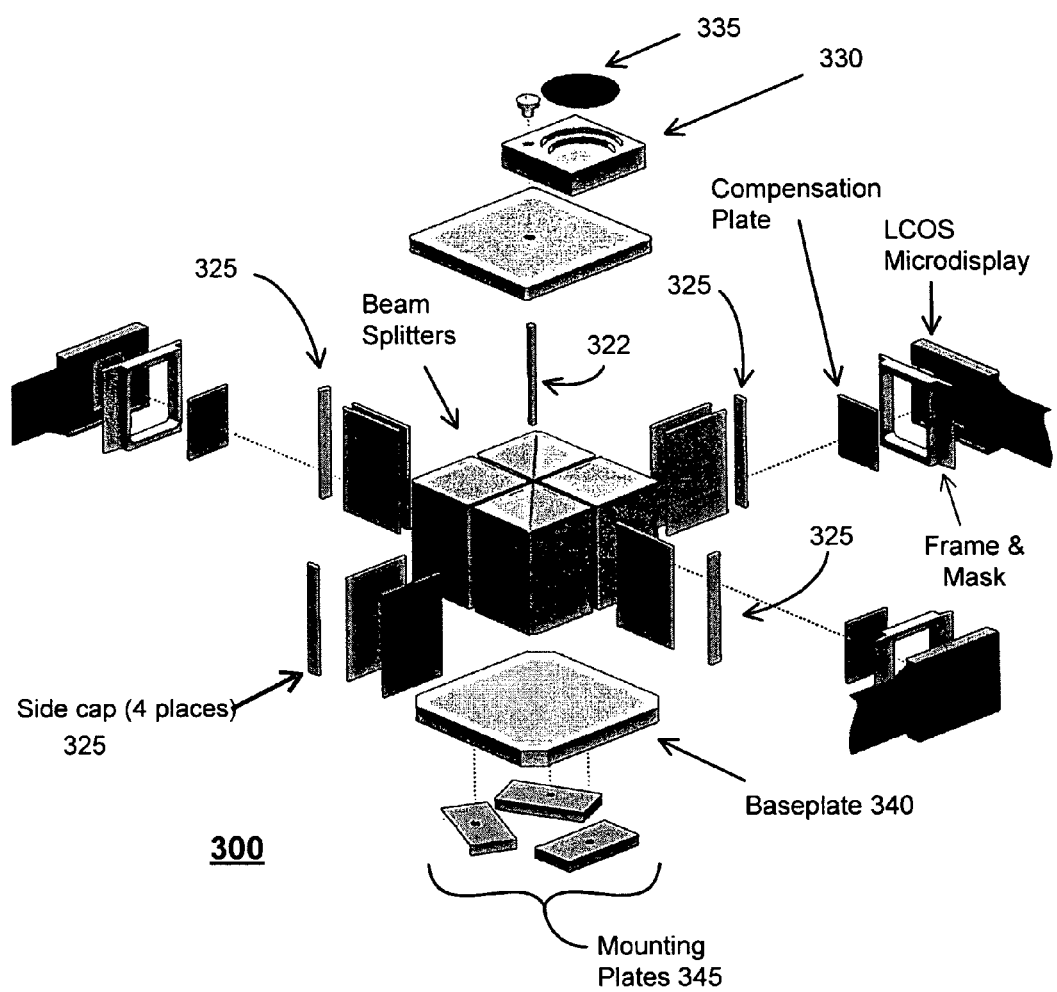
FIG. 3 is an exploded view of the example lms-AT Kernel.

FIG. 3 is an exploded diagram of a prism assembly 300 consistent with the design of the lms-AT kernel. FIG. 3 specifically indicates the side caps 325.

The prism assembly 300 also includes an expansion compensation device 330 comprising, for example, a diaphragm 335 fitted over an opening of the prism assembly. The diaphragm accommodates expansion of optical coupling fluid and differential expansion between the various optical components and the optical coupling fluid.

A glass rod 322 maintains positions of planar components between adjacent faces of the Beam Splitters. A base plate 340, for example provides rigidity and holds the beam splitters in pathlength matched positions within the prism assembly. Mounting plates 345 attach to the base plate 340. The mounting plates 345 are, for example, spaced at a specific pattern so that the prism assembly/kernel cannot be mounted incorrectly in the optical device for which it is designed The side cap components (side caps 325) are attached in 4 places to the sides of the prism assembly 300 and cover the channels 272 between the PBS cubes. Their function is to add mechanical strength to the prism assembly. They also serve to seal the prism assembly thus enabling containment of the liquid. The presence of side caps leads to the need for materials, tooling and assembly labor. We note that, in general, one means to lower product cost is to reduce the number and/or amount of materials, tooling and labor.

The present invention is the use of internal frames. The frames are used, for example, to any of precisely orient planar components, increase planar component efficiency, reduce production costs, and other benefits.

A basic frame 400 contains a window 410 as illustrated in FIG. 4A. The size of the frame is, for example, the same as a face of an adjacent beamsplitter. When the frame is placed in a kernel its size and shape assures that the window 410 is properly located and oriented. That orientation and location is, for example, within a channel between adjacent PBSs. The size, shape and position of the window is chosen to be such that the planar component will match that of the rectangular cone of light at the location of the specific planar component. In one embodiment, the size of the window and the planar component are larger than the rectangular cone, but smaller than the original planar component size.

A planar component can be attached to the frame in various ways. In one embodiment, a planar component 415 is glued inside the window as illustrated in FIG. 4B.

In another embodiment, a planar component 420 is glued to one side of the frame as illustrated in FIG. 4C. In yet another embodiment, utilizing the side attachment method, for example, two planar components are mounted to the window of one frame. An example of two planar components mounted to a frame is illustrated in FIG. 4D.

Figure 4E:
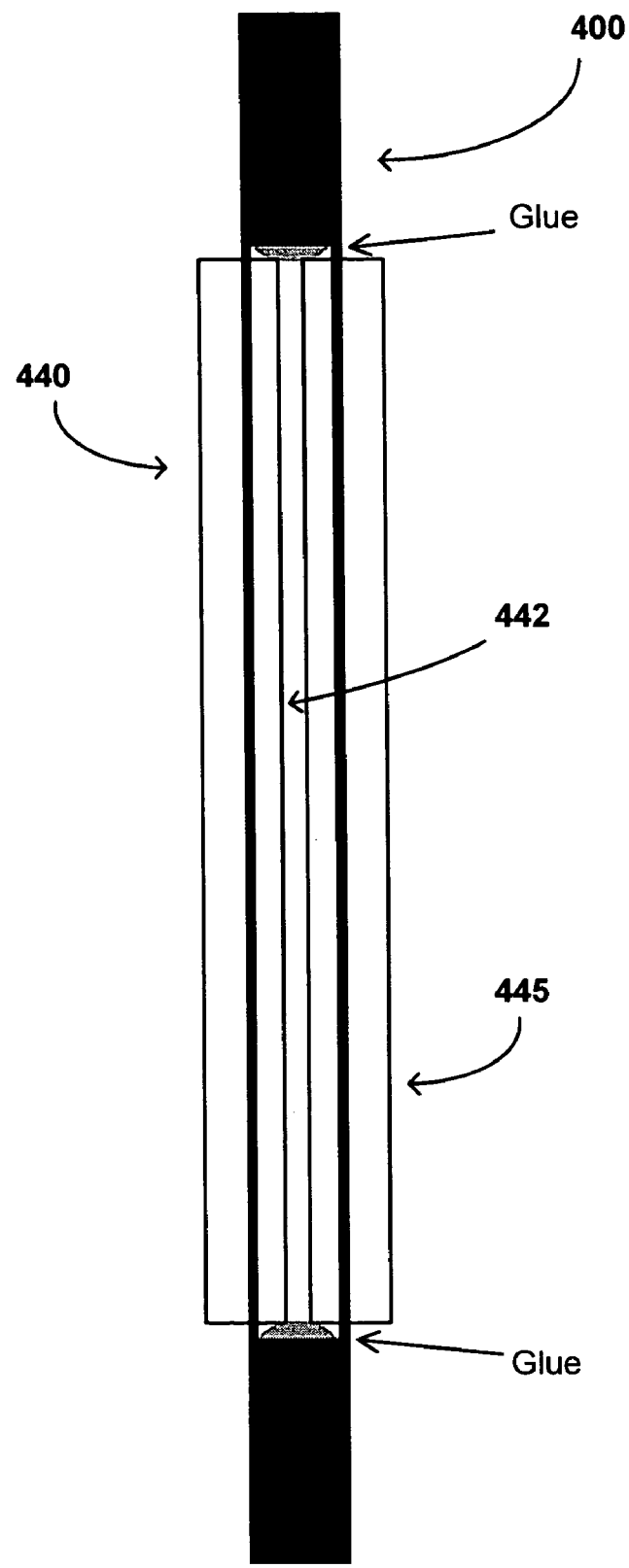
FIG. 4E is an illustration of a dual planar frame according to an embodiment of the present invention.

FIG. 4E is an illustration of a dual planar frame according to an embodiment of the present invention. Planar components 440 and 445 are both mounted inside the window of frame 400. The planar components are, for example, a dichroic (e.g., green dichroic) and a reflective polarizer, or a dichroic (e.g. magenta dichroic) and a Color select (e.g., a color select material mounted between to substrates to form a color select planar component) or two quarter waveplates, or a half waveplate and a spacer glass. As with all of the dual planar element frames discussed herein, a gap 442 between the components is, for example, one of liquid filled, or air filled. If liquid filled, the liquid is chosen for optical quality including having an index of refraction matching as close as possible to each of the planar components 440 and 445 (or an intermediate value between the indexes of refraction of the two planar components if their refraction indexes do not match), and to be inert to all surfaces in which the liquid comes in contact.

Note that the particular frame illustrated in FIG. 4A has been blackened. The purpose and result of the blackening is that the frame becomes an internal baffle. The baffle absorbs any light that is not in a respective light cone passing through the planner component. That is, the baffle will absorb stray light thus improving both the sequential and ANSI contrast ratios of the projected image.

Figure 5:
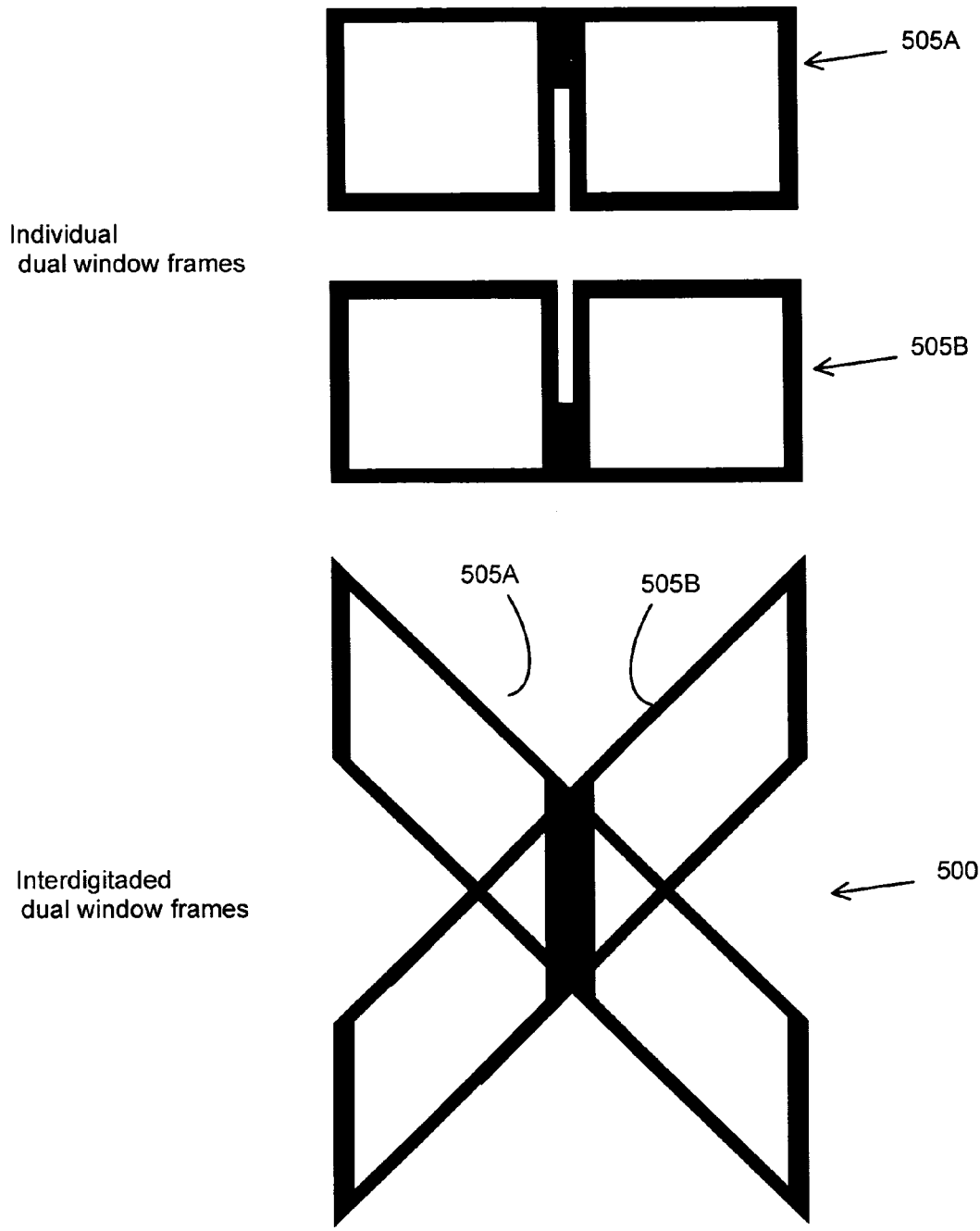
FIG. 5 is a drawing of interdigitated dual window frames according to an embodiment of the present invention.

FIG. 5 is a drawing of interdigitated dual window frames 500. The size, shape and positions of the windows in the dual window frames are such that they align properly with the light cones in the channels on opposite sides of the kernel. Note that two dual frames (e.g. dual frames 505A and 505B) are utilized to hold the planar components in a quad style kernel (the lms-AT is an example of a more general class of quad-style prism assemblies and/or kernels). One mechanism to accommodate two dual frames in the kernel is to interdigitate them as illustrated in FIG. 5. In one embodiment slots 510A and 510B are tooled or machined into the dual frames and designed to mesh together. When meshed together, or held in place at relative positions according to a prism assembly design, the frames are returned to as being interdigitated.

Figure 6:
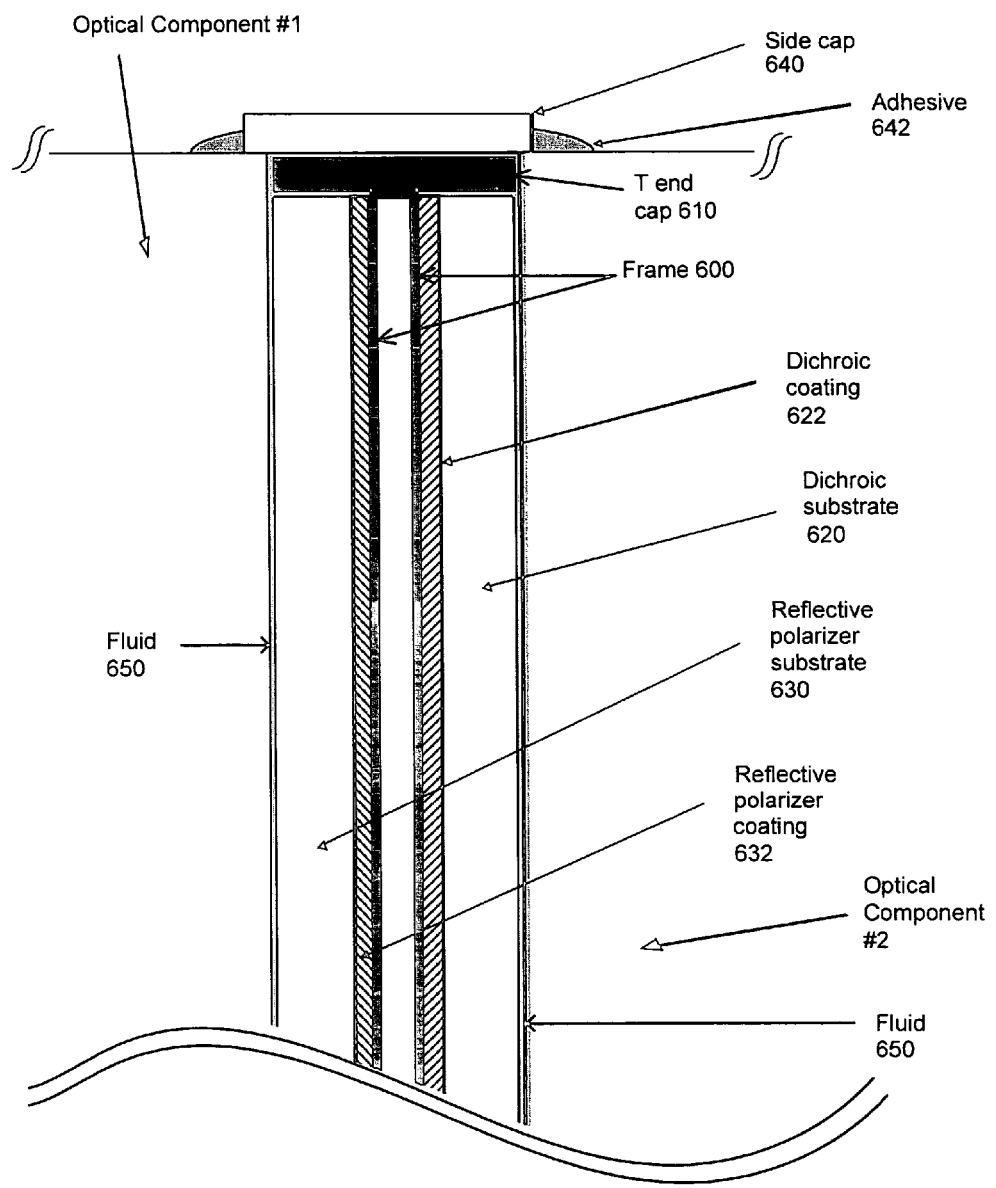
FIG. 6. is a drawing of a frame fitted in a channel of a prism assembly design using side caps according to an embodiment of the present invention.

The frame(s) can be made to be fit entirely within a channel of the prism assembly (e.g., channel 272). When fit within a channel, the frames are consistent with the use of side caps. FIG. 6. is a drawing of a frame fitted in a channel of a prism assembly design using side caps. As shown in FIG. 6, a frame 600 is disposed in a channel between Optical Component #1 and Optical Component #2. The optical components are, for example, beamsplitters (e.g., polarizing beamsplitters PBSs). The frame 600 includes frame and window similar to the previously described frame 400, but includes a T end cap 610. The T end cap provides rigidity and additional points of attachment for planar components. In the example of FIG. 6, the frame 600 mounts 2 planar components, a dichroic comprising, for example, a dichroic substrate 620 and dichroic coating 622, and a reflective polarizer comprising, for example, a reflective polarizer substrate 630 and reflective polarizer coating 632. Side cap 640 provides, for example, rigidity to the prism assembly, and, in embodiments where the channel is liquid filled, seals the channel. More importantly, when the side caps are fixed to the prism assembly, the tolerances of the position of the window, window size, and cone of light are such that all of the cone or light for a corresponding component or set of planar components passes through the window. FIG. 6 is a liquid coupled embodiment and a fluid 650 is dispersed between the planar components and adjacent faces of the optical components (e.g., optical component #1 and optical component #2).

Figure 7:
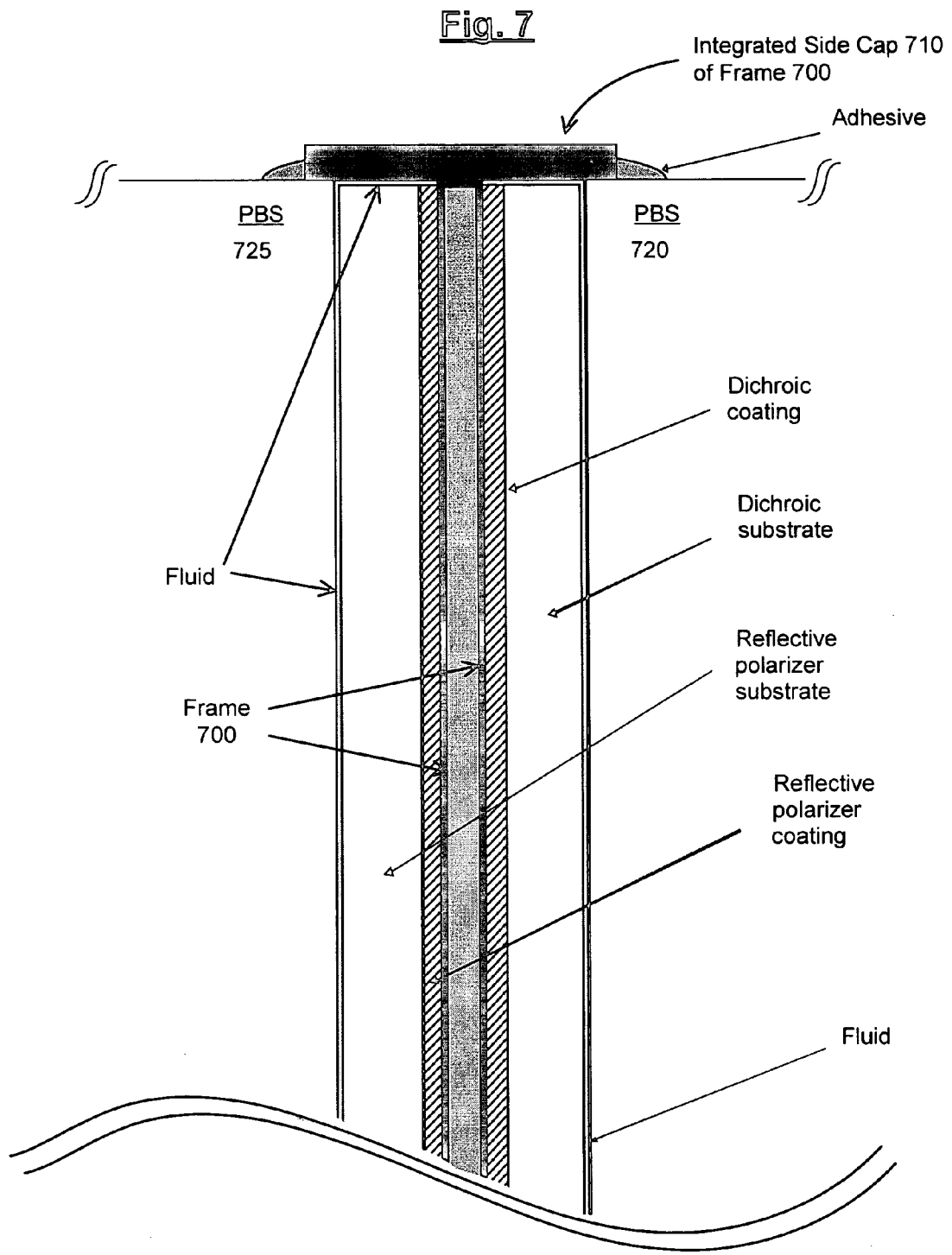
FIG. 7 is a drawing of a frame having integrated side caps according to an embodiment of the present invention.

Alternately, it is possible to integrate the side cap function into the frame itself. FIG. 7 is a drawing of a frame having integrated side caps according to an embodiment of the present invention. As shown in FIG. 7, a frame 700 includes an integrated side cap 710. The integrated side cap 710 is, for example, a seal for channel between PBS 720 and PBS 725. The integrated side cap 710 also provides support and rigidity to the overall prism assembly in which the PBSs are, for example, installed. Less parts and assembly are required to implement the scheme in FIG. 7. It therefore represents a means to reduce the cost of the kernel.

Figure 8:
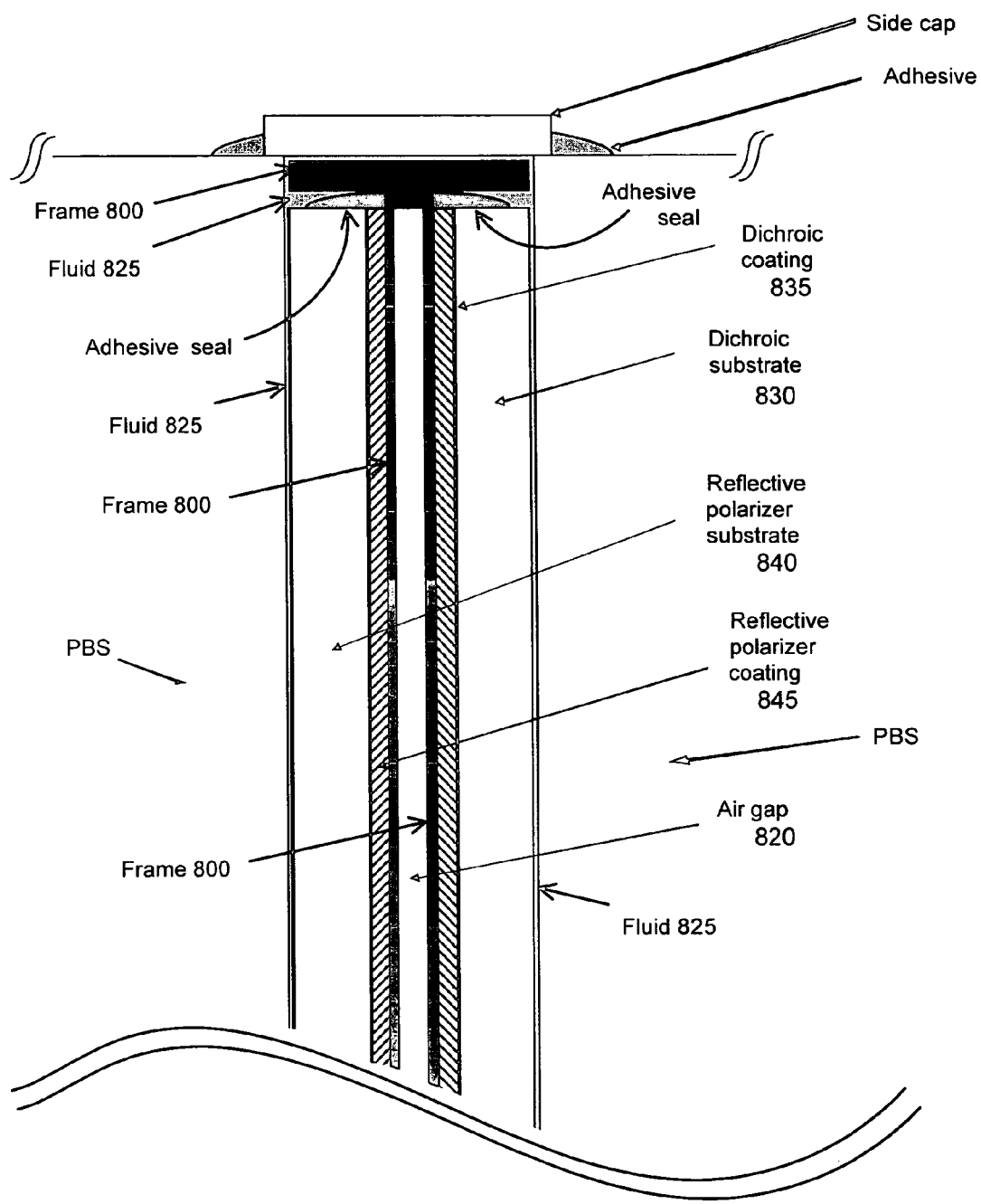
FIG. 8 is a drawing of a frame and planar components incorporating an air gap according to an embodiment of the present invention.

FIG. 8 is a drawing of a frame 800 and planar components incorporating an air gap according to an embodiment of the present invention. The air gap 820 is, for example, sealed between a dichroic coating 835 and a reflective polarizer coating 845. The air gap 820 enables the full extinction ratio of the reflective polarizer and, consequentially, an increase in the contrast ratio of the light channel in which it is installed (e.g. green light channel). FIG. 8 is just one example of how an air gap may be implemented in a design. In particular, FIG. 8 is an air gap implemented using a frame, however, the invention may be extended to the provision of an air gap in any way in any other design that would otherwise not include an air gap (e.g., an air gap added to a planar component without a frame).

Figure 9:
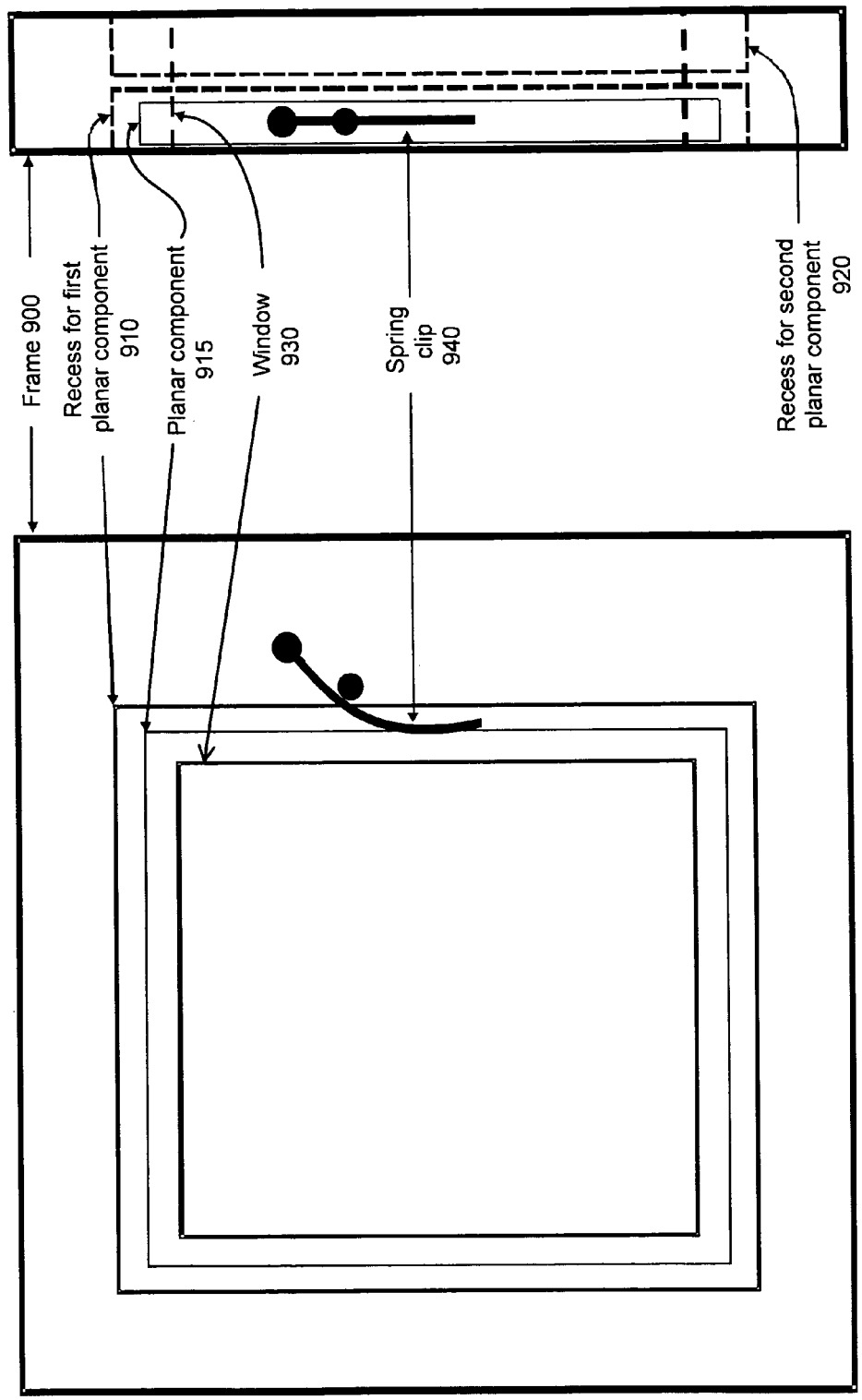
FIG. 9 is a drawing of a recessed frame according to an embodiment of the present invention.

FIG. 9 is a drawing of a recessed frame 900 according to an embodiment of the present invention. The frame 900 contains a recess 910 configured to fit a first planar component 915. Planar component 915 is inserted into the recess 910 of frame 900. In one embodiment, two planar components are fitted into the frame 900 by providing recesses in opposite sides of the frame (e.g. recess 910 and recess 920). In one embodiment, the planar components are glued into the frame 900. FIG. 9 illustrates an alternative. A small spring (e.g. Spring Clip 940) is configured to press against the side of the planar component so as to hold it into the recess. Other attachment mechanisms, including without limitation, clips, cover glasses, adhesives, etc. may also be utilized. As with all other frames discussed herein, the frame 900 can be an interdigitated dual frame and/or blackened.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing recesses, adhesive, frame, spring, caps, PBSs, channels, fluids, substrates, coatings, etc., any other equivalent device, or other device having an equivalent function or capability, whether or not listed herein, may be substituted therewith. Furthermore, the inventors recognize that newly developed technologies not now known may also be substituted for the described parts and still not depart from the scope of the present invention. All other described items should also be considered in light of any and all available equivalents.

The present invention may suitably comprise, consist of, or consist essentially of, any of element (the various parts or features of the invention) and equivalents. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A prism assembly, comprising:
    a set of beamsplitters including a set of modulating faces and configured to, separate an input light beam into a set of component light beams, direct each component light beam to a corresponding one of a set of modulating faces of the prism assembly, and recombine light beams reflected from the modulating faces into a modulated output beam;
    a planar optical component; and
    an internal frame coupled to the planar optical component and configured to position the planar optical component in a channel, the channel being defined between a first face of a first beamsplitter of the set of beamsplitters and a second face of a second beamsplitter of the set of beamsplitters, wherein the first face is adjacent to the second face, wherein the planar optical component is positioned in a rectangular cone of the at least one of the component light beams passing through the channel and wherein the channel orients the planar optical component relative to the first face and the second face, wherein the channel is filled with an optical coupling liquid, wherein the prism assembly comprises a quad style prism assembly comprising 4 beamsplitters and the internal frame comprises a set of two internal interdigitated dual frames configured to place the planar optical component in each of 4 channels between adjacent faces of the beam splitters.

2. The prism assembly according to claim 1, wherein the internal frame includes a window and wherein the window has a window shape and a window size substantially equal to the rectangular cone of the at least one component light beam passing through the channel.

3. The prism assembly according to claim 1, wherein the beamsplitters comprise Polarizing Beam Splitters (PBSs).

4. The prism assembly according to claim 1, wherein at least one of the two internal interdigitated dual frames comprises a dual planar element frame.

5. The prism assembly according to claim 1, wherein at least one of the two internal interdigitated dual frames comprises a dual planar element frame and an-air gap.

6. The prism assembly according to claim 5, wherein the air gap is immersed in an index matching fluid.

7. The prism assembly according to claim 5, wherein the air gap is formed between the dual planar optical components that are optically coupled to adjacent faces of the prism assembly via the optical coupling liquid and wherein the optical coupling liquid has an index of refraction matching the dual planar optical components.

8. The prism assembly according to claim 1, further comprising at least one reflective microdisplay package coupled to at least one of the modulating faces, wherein the at least one reflective microdisplay package is configured to modulate at least one of the component light beams with a color content corresponding to a color of the at least one component light beam.

9. The prism assembly according to claim 1, wherein the reflective microdisplay packages comprise Liquid Crystal On Silicon (LCOS) microdisplays.

10. The prism assembly according to claim 1, further comprising at least one Liquid Crystal On Silicon (LCOS) microdisplay coupled to each processing face and the prism assembly is installed in a LCOS based High Definition (HD) Television (RPTV).

11. A device, comprising:
    a first open window;
    a first frame including a perimeter of the first open window;
    a first planar optical component disposed on the first frame such that a first cone of light passing through the first open window also passes through the first planar optical component, wherein the device is immersed in a optical coupling liquid in a channel between adjacent beamsplitter faces of a prism assembly, the optical coupling liquid having an index of refraction matching the first planar optical component, and wherein the channel orients the planar optical component relative to the first face and the second face; and
    a second frame configured as the first frame, wherein the first frame is interdigitated with the second frame.

12. The device according to claim 11, further comprising: a second planar component adjacent to the first planar component.

13. The device according to claim 12, further comprising an air gap between first planar component and the second planar component.

14. The device according to claim 11, further comprising:
    a second open window, wherein the first frame further includes a perimeter of the second open window;
    a third planar optical component disposed on the first frame such that a second cone of light passing through the second open window also passes through the third planar optical component.

15. The device according to claim 14, further comprising: wherein the first frame and the second frame are immersed in optical coupling liquid in a channel between adjacent faces of a prism assembly.

16. The device according to claim 11, wherein the first window and the second window are located in a same plane.

17. The device according to claim 11, wherein:
    the first frame is further defined by a second perimeter of a second open window in a same plane as the first open window.

18. The device according to claim 11, wherein the prism assembly is part of a Liquid Crystal On Silicon video projection system of a LCOS High Definition (HD) Rear Projection Television (RPTV).

* * * * *